No. 886,149. PATENTED APR. 28, 1908.
H. G. McCOOL.
SYLLABIC KEYBOARD FOR TYPE WRITERS AND TYPE SETTING MACHINES.
APPLICATION FILED AUG. 21, 1906.
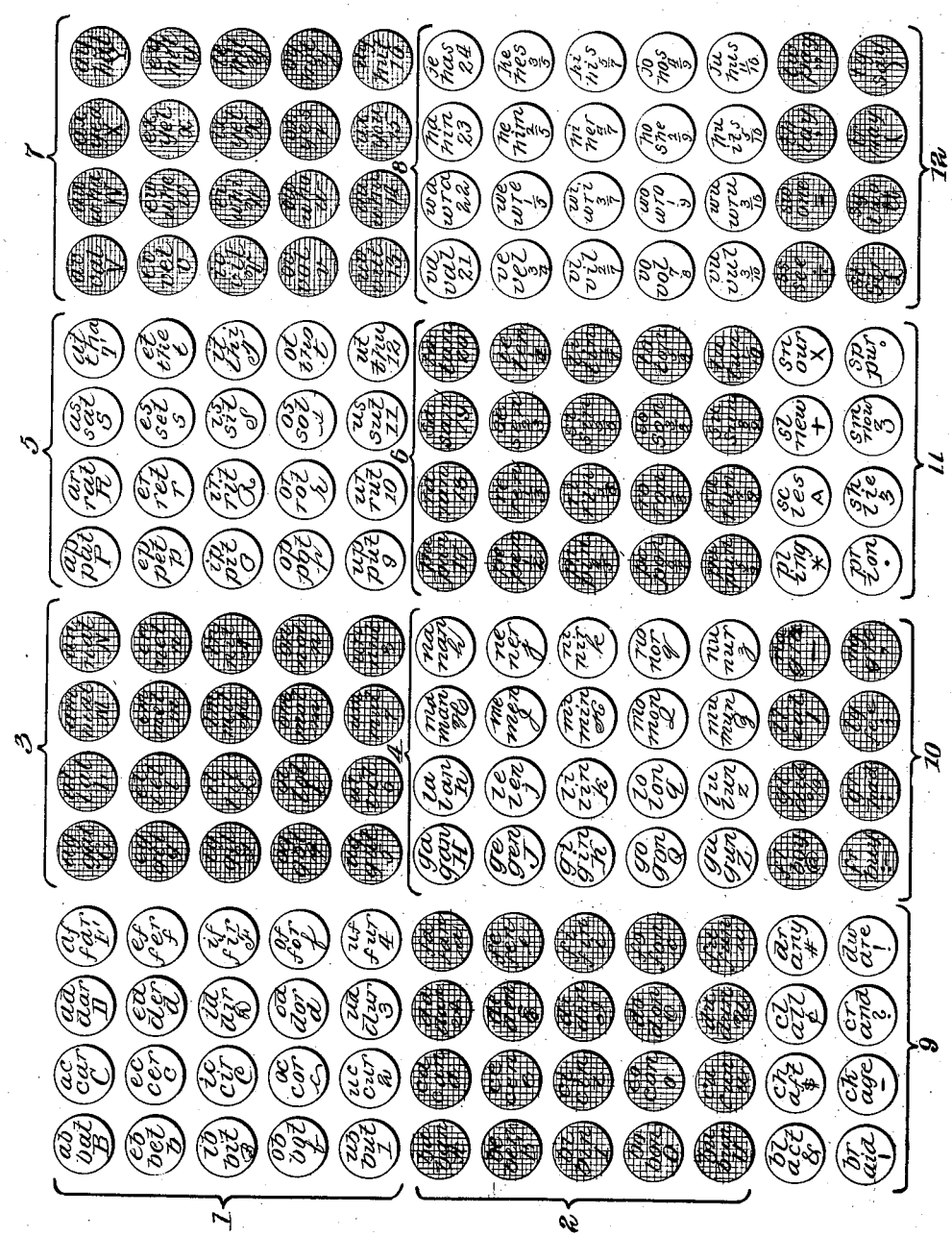
WITNESSES
Samuel E. Wade.
Amos W. Hart
INVENTOR
HENRY G. McCOOL.
BY Munn & Co.
ATTORNEYS

UNITED STATES PATENT OFFICE.

HENRY GAYLORD McCOOL, OF CARMICHAELS, PENNSYLVANIA.

SYLLABIC KEYBOARD FOR TYPE-WRITERS AND TYPE-SETTING MACHINES.

No. 886,149.　　　Specification of Letters Patent.　　　Patented April 28, 1908.

Application filed August 21, 1906. Serial No. 331,511.

*To all whom it may concern:*

Be it known that I, HENRY G. McCOOL, a citizen of the United States, and a resident of Carmichaels, in the county of Greene and State of Pennsylvania, have invented an Improved Syllabic Keyboard for Type-Writers and Type-Setting Machines, of which the following is a specification.

The object of the invention is to obtain great speed and thus enable more work to be done in a shorter time than has been heretofore possible on typewriters and analogous machines. To accomplish this, both letters and syllables are used in a new arrangement or association.

The accompanying drawing represents the keyboard in plan view.

The key-board consists of twelve rows of keys, sixteen keys to the row, and the several rows being arranged in an incline plane, one rising above another as in the well-known Smith-Premier machine. The keys are arranged in blocks, groups, or divisions, indicated in the drawings by numbers 1 to 12 inclusive. Considering, first, division 1, it will be seen that the first four consonants of the alphabet, namely, B, C, D, F, distinguish it. In other words it is composed of 20 keys, and the four in the first, second, third and fourth horizontal rows bear successively the consonants B, C, D, F, the same being alternately upper and lower-case on the several rows. The fifth or lowest row bears the numerals 1, 2, 3, 4, in place of the consonants before named. On each of the 20 keys there are formed two syllables, or words, by union or association of the aforesaid consonants and the five vowels a, e, i, o, u. Thus, on the first key, the first vowel and consonant of the alphabet form "ab" and "bat"; on the second in the same row, the syllables "a c" and "car" appear; on the third are "a d" and "dar"; and on the fourth, "a f" and "far." On the row below the first, the second vowel e is used in place of a, along with consonant b to form "e b" and "bet," "e c" and "cer"; "ed" and "der," and "e f" and "fer," respectively. Finally, on the lowest row, the vowel u is used with consonant b to form "u b" and "but", "u c" and "cur," "u d" and "dur," and "uf" and "fur," respectively.

In block or division 2, the arrangement in block 1 is practically reversed, the vowels a, e, i, o, u, being the chief distinguishing feature, and combined with consonants b, c, d, f, to form in the first row letter groups, syllables or words, "ba," "ban," "ca," "can," "da," "dan," "fa," "fan"; and in the second, or next, row, "be," "ben," "ce," "cen," "de," "den," "fe," "fen"; and in the third row, "bo," "bon," "co," "con," "do," "don," "fo" "fon"; and so on.

It will be seen that block 1 thus utilizes the vowels and the first four consonants. In block 3, the said vowels are again combined or associated with the next group of consonants, namely, g, l, m, n, to form in the first row the syllables ag, gat, at, lat, am, mat, an, nat; and in the second row, eg, get, et, let, em, met, en, net, in the third row, ig, git, it, lit, im, mit, in, nit; and so on. Again, in block 4, this order is practically reversed, so that said block is related to block 3 in the same way as block 2 to block 1; namely, in the first row of keys, appear ga, gan, la lan, ma man, na nan, and in the second row, ge gen, le, len.

Block 5 employs consonants p, r, s, t, and block 7 the consonants v, w, x, y, and vowels a, e, i, o, u, in the same manner as before described in reference to preceding consonants in blocks 1, 3, 5, etc.

The numerals 1 to 16 are applied to the several keys in the 4th row or bank, and numerals 17 to 24 are applied to the lower row of contiguous blocks 6 and 8, while fractional numbers $\frac{1}{2}$, $\frac{1}{3}$, $\frac{2}{3}$, $\frac{1}{4}$, $\frac{3}{4}$, etc., up to 11/16 are applied to the other rows in blocks 6 and 8. The several blocks 9, 10, 11 and 12, consist each of eight keys which bear letters, syllables, signs, and symbols useful and necessary to fill out a key-board intended as this is to facilitate very rapid work.

Taking the grouping or arrangement as a whole of letters, syllables, or words, and signs, including numerals, it is very quickly learned, with the result that much greater speed in typewriting may be attained than by any other keyboard or system known to me.

For sake of easier distinction of the several blocks from each other, those blocks which are in diagonal, or cornerwise relation to each other are colored black; but of course any other preferred color may be employed.

What I claim is—

1. In a keyboard of the class indicated, a series of blocks of keys bearing as marks the vowels a, e, i, o, u, and the series of consonants associated with said vowels in alphabetical order and thus forming syllables, substantially as described.

2. The keyboard of the class indicated formed of keys arranged in blocks, each comprising five rows of keys which bear consonants arranged successively in alphabetical order and associated with the vowels a, e, i, o, u, in the same order, as shown and described.

HENRY GAYLORD McCOOL.

Witnesses:
KATE E. YOUNG,
MARGARET YOUNG.